US010685410B2

(12) United States Patent
Hassanzadeh

(10) Patent No.: US 10,685,410 B2
(45) Date of Patent: *Jun. 16, 2020

(54) OPTIMIZING SPLIT FERTILIZER APPLICATION

(71) Applicant: The Climate Corporation, San Francisco, CA (US)

(72) Inventor: Anahita Hassanzadeh, San Francisco, CA (US)

(73) Assignee: THE CLIMATE CORPORATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/565,225

(22) Filed: Sep. 9, 2019

(65) Prior Publication Data
US 2020/0005402 A1 Jan. 2, 2020

Related U.S. Application Data

(63) Continuation of application No. 15/246,101, filed on Aug. 24, 2016, now Pat. No. 10,410,299.

(51) Int. Cl.
G06Q 50/00 (2012.01)
G06Q 50/02 (2012.01)
(Continued)

(52) U.S. Cl.
CPC ....... *G06Q 50/02* (2013.01); *G06Q 10/06314* (2013.01); *G06Q 40/12* (2013.12)

(58) Field of Classification Search
CPC ....... A01B 79/005; A01B 79/02; A01C 21/00; G06Q 50/02; G06Q 10/06; G06Q 40/12; G06Q 10/06314
See application file for complete search history.

(56) References Cited

U.S. PATENT DOCUMENTS 7,275,042 B1 9/2007 Kelly
8,671,006 B2 3/2014 Zyskowski
(Continued)

FOREIGN PATENT DOCUMENTS

WO WO 2016/111376 A1 7/2016

OTHER PUBLICATIONS

Hassanzadeh, U.S. Appl. No. 15/246,101, filed Aug. 24, 2016, Office Action, dated Sep. 21, 2018.
(Continued)

*Primary Examiner* — Jonathan G Sterrett
*Assistant Examiner* — Stephen S Swartz
(74) *Attorney, Agent, or Firm* — Hickman Palermo Becker Bingham LLP; Malgorzata A. Kulczycka

(57) ABSTRACT

In an embodiment, a method comprises: receiving pre-planting data representing a lower bound date value and an upper bound date value of dates for a pre-planting application of fertilizer to an agricultural field; side-dressing data representing a lower bound date value and an upper bound date value of dates for a side-dressing application; fertilizer cost data representing a cost of a fertilizer application; labor cost data representing a cost of applying fertilizer to the field; and expected profit data. Based on the received data, one or more penalty constraints are determined. Based on the received data, a fertilizing schedule is generated. The schedule comprises the one or more valid calendar dates on which fertilizing the agricultural field is recommended and the one or more valid fertilizer amounts to be applied to the agricultural field on the one or more valid calendar dates to maximize a yield from the agricultural field.

20 Claims, 9 Drawing Sheets

(51) Int. Cl.
*G06Q 40/00* (2012.01)
*G06Q 10/06* (2012.01)

(56) References Cited

U.S. PATENT DOCUMENTS

| | | |
|---|---|---|
| 2002/0072956 A1 | 6/2002 | Willems |
| 2003/0182260 A1 | 9/2003 | Pickett et al. |
| 2013/0185104 A1 | 7/2013 | Klavins |
| 2013/0338931 A1 | 12/2013 | Maidl |
| 2014/0257623 A1 | 9/2014 | Carl |
| 2015/0373905 A1 | 12/2015 | Anderson et al. |
| 2016/0071410 A1 | 3/2016 | Rupp |
| 2016/0202227 A1 | 7/2016 | Mathur et al. |
| 2017/0169523 A1 | 6/2017 | Xu |
| 2017/0270446 A1 | 9/2017 | Starr |
| 2017/0287082 A1 | 10/2017 | Karube |
| 2018/0060975 A1 | 3/2018 | Hassanzadeh |

OTHER PUBLICATIONS

Hassanzadeh, U.S. Appl. No. 15/246,101, filed Aug. 24, 2016, Notice of Allowance, dated May 15, 2019.
Hassanzadeh, U.S. Appl. No. 15/246,101, filed Aug. 24, 2016, Interview Summary, dated Apr. 4, 2019.
Hassanzadeh, U.S. Appl. No. 15/246,101, filed Aug. 24, 2016, Final Office Action, dated Mar. 21, 2019.
The International Bureau of WIPO, "Preliminary Report on Patentability", in application No. PCT/US2017/044042, dated Feb. 26, 2019, 9 pages.
International Searching Authority, "Search Report" in application No. PCT/US2017/044042, dated Oct. 6, 2017, 19 pages.
Current Claims in application No. PCT/US2017/044042, dated Oct. 2017, 7 pages.
Current Claims in application No. PCT/US2017/044042, dated Feb. 2019, 6 pages.
European Patent Office, "Search Report" in application No. 17844094.7-1222, dated Dec. 9, 2019, 8 pages.
European Claims in application No. 14844094.7-1222, dated Dec. 2019, 5 pages.

OPTIMIZING SPLIT FERTILIZER APPLICATION

BENEFIT CLAIM

This application claims the benefit under 35 U.S.C. § 120 as a Continuation of application Ser. No. 15/246,101, filed Aug. 24, 2018, the entire contents of which is hereby incorporated by reference for all purposes as if fully set forth herein. The applicant hereby rescinds any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2016 The Climate Corporation.

FIELD OF THE DISCLOSURE

The technical field of the present disclosure includes computer systems useful in agriculture. The disclosure is also in the technical field of computer systems that are programmed or configured to generate computer implemented recommendations for use in agriculture for applying fertilizers to agricultural fields at the optimal rate and time to maximize yield while keeping costs at the minimum.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Determining an optimized schedule for applying fertilizer to an agricultural field is very important to crop growers and agricultural industry. The timing and manner in which fertilizer is applied to the soil directly affects the end-of-season yield and profitability. The decisions with regard to fertilizer applications may include determining the timing and frequency of the fertilizer applications, the type of fertilizer, and the amount of fertilizer to be applied to the soil in each application.

These decisions are usually made by taking into account several factors including observed and predicted weather conditions, previous yields, a geographic location of the field, a cost of fertilizer, and available equipment. However, even taking into account all these factors may be insufficient to generate optimized schedules for the field fertilizing practices.

SUMMARY

The appended claims may serve as a summary of the disclosure.

BRIEF DESCRIPTION OF THE DRAWINGS

In the drawings:

FIG. 6 depicts an example embodiment of a spreadsheet view for data entry.

DETAILED DESCRIPTION

Figure 1:
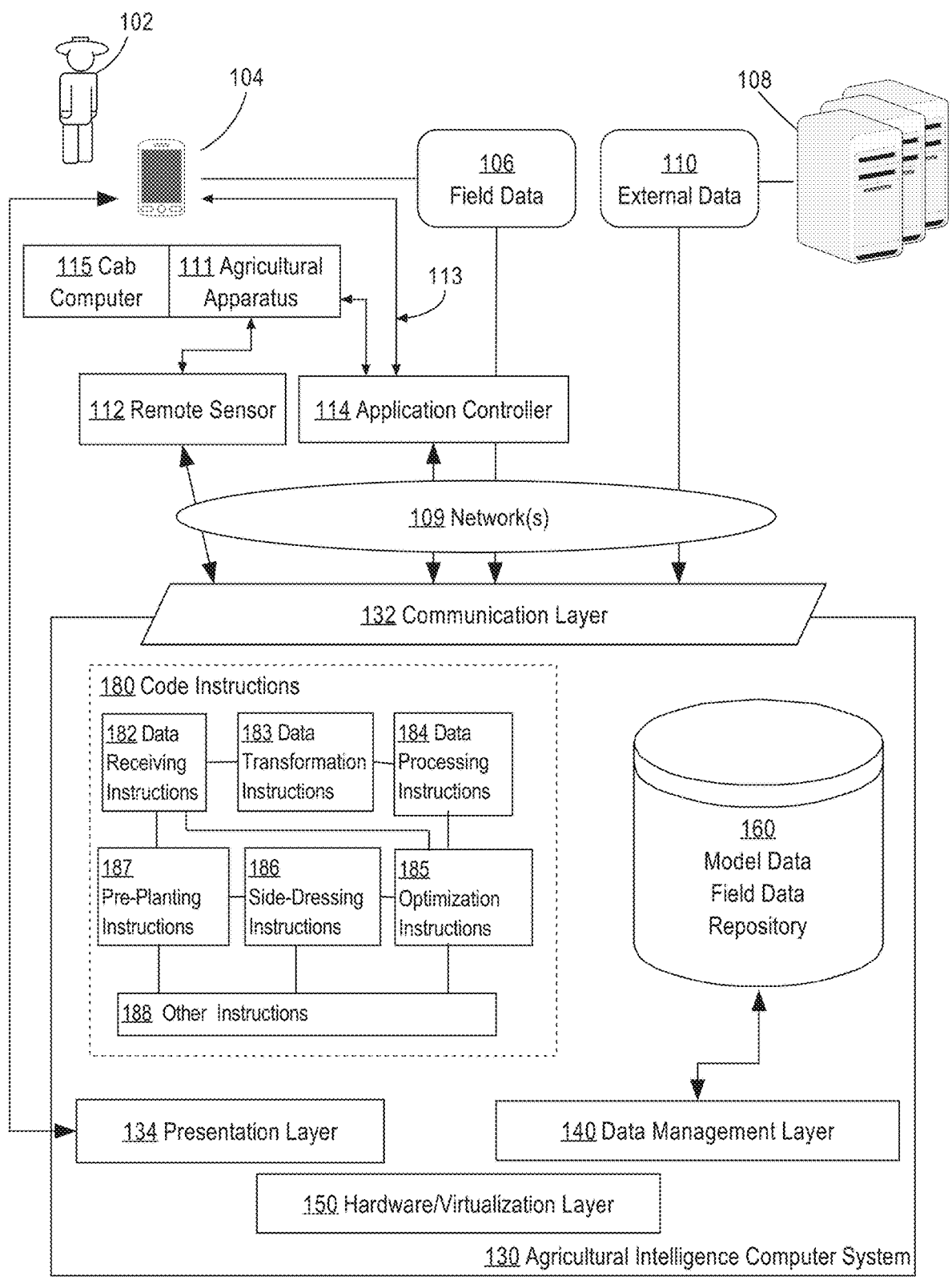
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW

2. EXAMPLE AGRICULTURAL INTELLIGENCE COMPUTER SYSTEM 2.1. STRUCTURAL OVERVIEW
  2.2. APPLICATION PROGRAM OVERVIEW
  2.3. DATA INGEST TO THE COMPUTER SYSTEM
  2.4. PROCESS OVERVIEW—AGRONOMIC MODEL TRAINING
  2.5. IMPLEMENTATION EXAMPLE—HARDWARE OVERVIEW

3. DETERMINING AN OPTIMIZED FERTILIZING SCHEDULE 3.1 PREDICTED PROFITS
3.2 OPTIMIZATION CONSTRAINTS
  3.2.1 DECISION VARIABLES
  3.2.2 AUXILIARY DECISION VARIABLES
  3.2.3 OPTIMIZATION PARAMETERS
  3.2.4 MAXIMIZING YIELD WHILE MINIMIZING COST
3.3 PENALTY FUNCTIONS
3.4 EXAMPLE IMPLEMENTATION OF A PENALTY FUNCTION 3.5 GENERATING AN OPTIMIZED FERTILIZING SCHEDULE
3.5.1 EXAMPLE COMPUTING ENVIRONMENT
3.5.2 EXAMPLE PROCESS
3.5.3 EXAMPLE RECOMMENDATIONS

4. EXTENSIONS

1. General Overview

In an embodiment, an approach for determining an optimized fertilizing schedule for an agricultural field to maximize profits obtained from crop harvested from the field is presented. The approach allows optimizing the fertilizer application schedule for the field to obtain the maximum yield while keeping the overall cost of cultivating the field at its minimum. One benefit of the optimized approach for determining the fertilizing schedule for the field is that the optimized schedule may help crop growers to customize their practices to increase the productivity and yield harvested from the field.

An approach for determining an optimized fertilizing schedule may be implemented in any type of computing device. For example, the approach may be implemented in a computer server, a workstation, a laptop, a smartphone, or any other electronic device configured to receive, transmit, and process electronic data.

In an embodiment, an approach comprises receiving, at an electronic device, over a computer network one or more types of data. The data may include pre-planting data representing a lower bound date value and an upper bound date value of dates for a pre-planting application of fertilizer to an agricultural field. The data may also include side-dressing data representing a lower bound date value and an upper bound date value of dates for a side-dressing application of fertilizer to the agricultural field fertilizer. Furthermore, the data may include cost data representing a cost of a fertilizer application; labor cost data representing a cost of applying fertilizer to the agricultural field; and/or expected profit data. Expected profit data may represent various things. For illustrating clear examples, the expected profit data represents predicted profits from selling the crop harvested from the field.

Based on, at least in part, the pre-planting data, the side-dressing data, the fertilizer cost data, the labor cost data, and the expected profit data, one or more penalty constraints are determined. The penalty constraints may specify one or more conditions for determining one or more valid calendar dates, and/or one or more valid fertilizer amounts. A valid calendar date may be a date that corresponds to an actual calendar date within a pre-planting season, and/or a side-dressing season. A valid fertilizer amount may be a non-negative weight amount of one or more bags of fertilizer available from fertilizer's retailers.

Based on, at least in part, the pre-planting data, the side-dressing data, the fertilizer cost data, the labor cost data, the expected profit data, and the one or more penalty constraints, an optimized fertilizing schedule is generated. An optimized fertilizing schedule may comprise one or more valid calendar dates on which it is recommended to fertilize the agricultural field. The optimized fertilizing schedule may also comprise one or more valid fertilizer amounts to be applied to the agricultural field on the one or more valid calendar dates to maximize yield from the agricultural field.

In an embodiment, a fertilizing schedule for an agricultural field is determined to maximize profits while minimizing costs. More specifically, the fertilizing schedule may provide recommendations for optimizing the fertilizer application schedule for the field to obtain the maximum yield while keeping the overall cost of the fertilizer application at its minimum.

In an embodiment, a fertilizing schedule determined for a field includes an indication of a type of fertilizer to be applied to the field on the one or more valid calendar dates to maximize yield from the field.

In an embodiment, an optimized fertilizing schedule is displayed on a display device. The schedule may be displayed on for example, a monitor of a workstation, a display of a smartphone, and other computer-generated displays.

In an embodiment, one or more penalty constraints are used to generate a fertilizing schedule. The penalty constraints may be expressed using a quadratic penalty function and may include one or more penalty values. The penalty values may be determined based on one or more of: the lower bound date value and the upper bound date value of dates for the pre-planting application of fertilizer to a field, the lower bound date value and the upper bound date value of dates for the side-dressing application of fertilizer to the field, or a set of non-negative valid amounts of fertilizer.

In an embodiment, one or more penalty constraints are used to determine the type of data to be used to generate an optimized fertilizing schedule. For example, the penalty constraints may be used to determine that a fertilizing schedule is to be generated based on one or more of: a cost of applying fertilizer to the agricultural field on a particular date, or a cost of a particular amount of fertilizer applied to the agricultural field on the particular date.

In an embodiment, one or more penalty constraints are used to determine whether to include, in determining the fertilizing schedule, one or more of: a cost of labor associated with applying fertilizer to the field on a particular date, a cost of labor associated with harvesting crop from the agricultural field, an amortization cost of equipment used to apply fertilizer to the agricultural field on the particular date, or an amortization cost of equipment used to harvest crop from the agricultural field.

In an embodiment, a presented approach provides many benefits that are not obtainable using other approaches including the Nitrogen Advisor. The approach herein may be configured to generate recommended dates for fertilizing a field and generate specific amounts of fertilizer to be applied on each of the dates. In contrast, other approaches select, not generate, fertilizing dates from a predetermined set of dates and select fertilizer amounts from a predetermined set of amounts. For example, even if other conventional approaches select a fertilizer amount from a set of 18 different amounts of fertilizer, the approaches cannot provide as broad optimization capabilities as the presented approach.

Furthermore, a presented process allows extending the search space of optimal dates for applying fertilizer to a field. Other approaches consider only three dates for applying the fertilizer. In contrast, the presented approach may consider more than three dates for a pre-planting season, and/or more than three dates for a side-dressing season.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

In an embodiment, agricultural intelligence computer system 130 is programmed with or comprises code instructions 180. For example, code instructions 180 may include data receiving instructions 182 which are programmed for receiving, over network(s) 109, electronic digital data comprising yield-related data. Code instructions 180 may also include data transformation instructions 183 which are programmed for transforming the received data; data processing instructions 184 which are programmed for processing the transformed data; optimization instructions 185 which are programmed for optimizing the processed data; side-dressing instructions 186 which are programmed for determining fertilizing recommendations for side-dressing; pre-planting instructions 187 for determining fertilizing recommendations for pre-planting, and other detection instructions 188.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGR-ESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
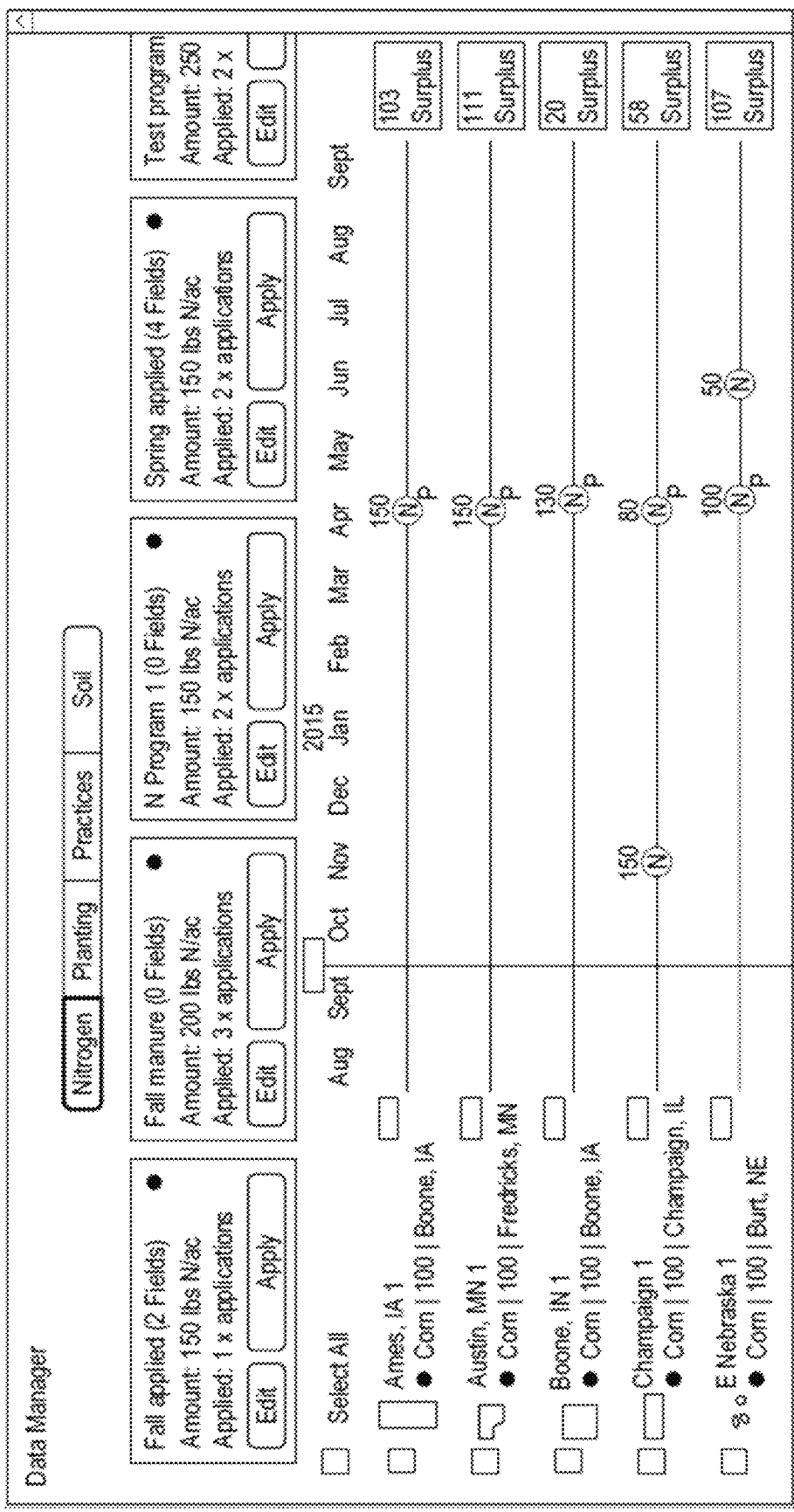
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

Figure 6:
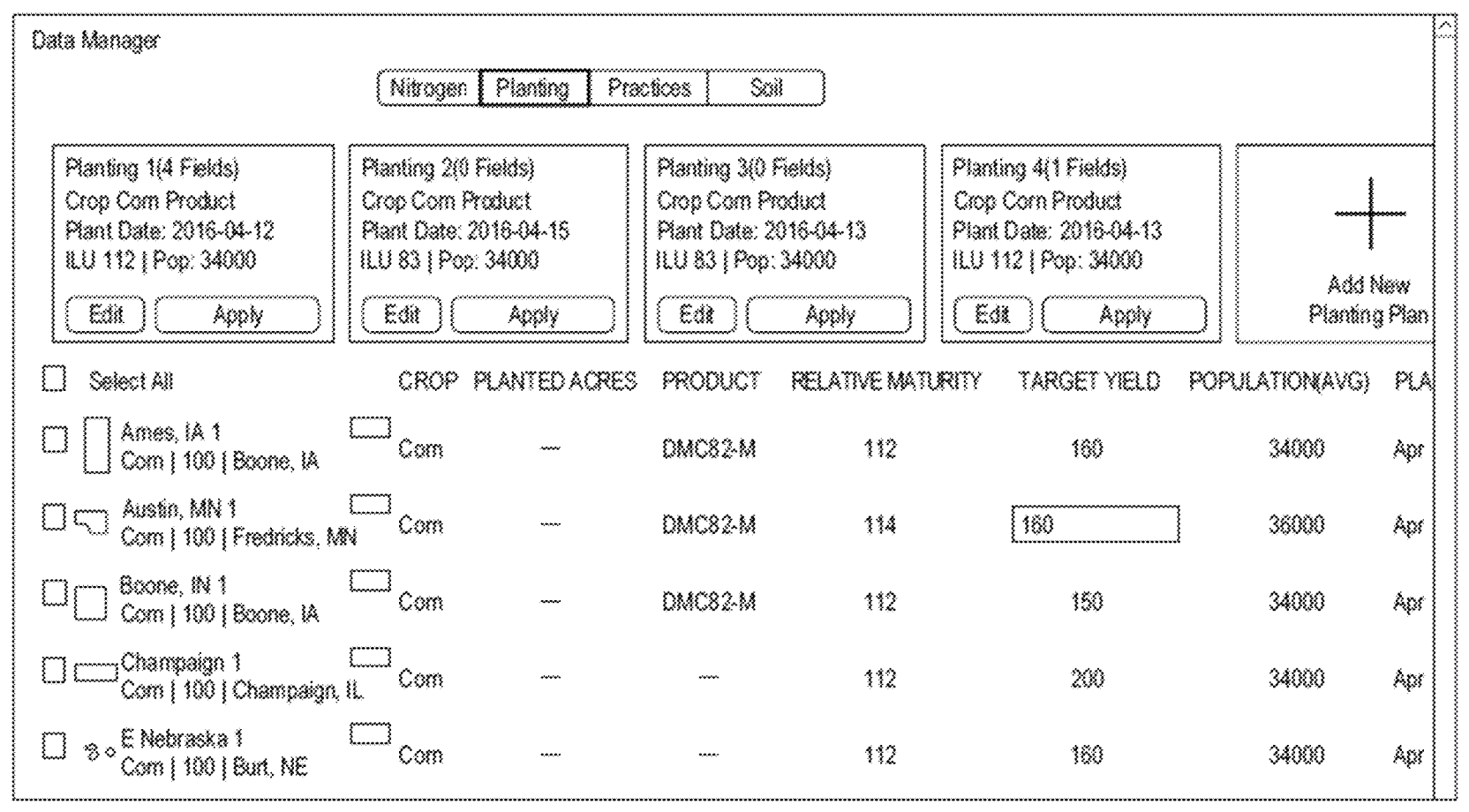

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
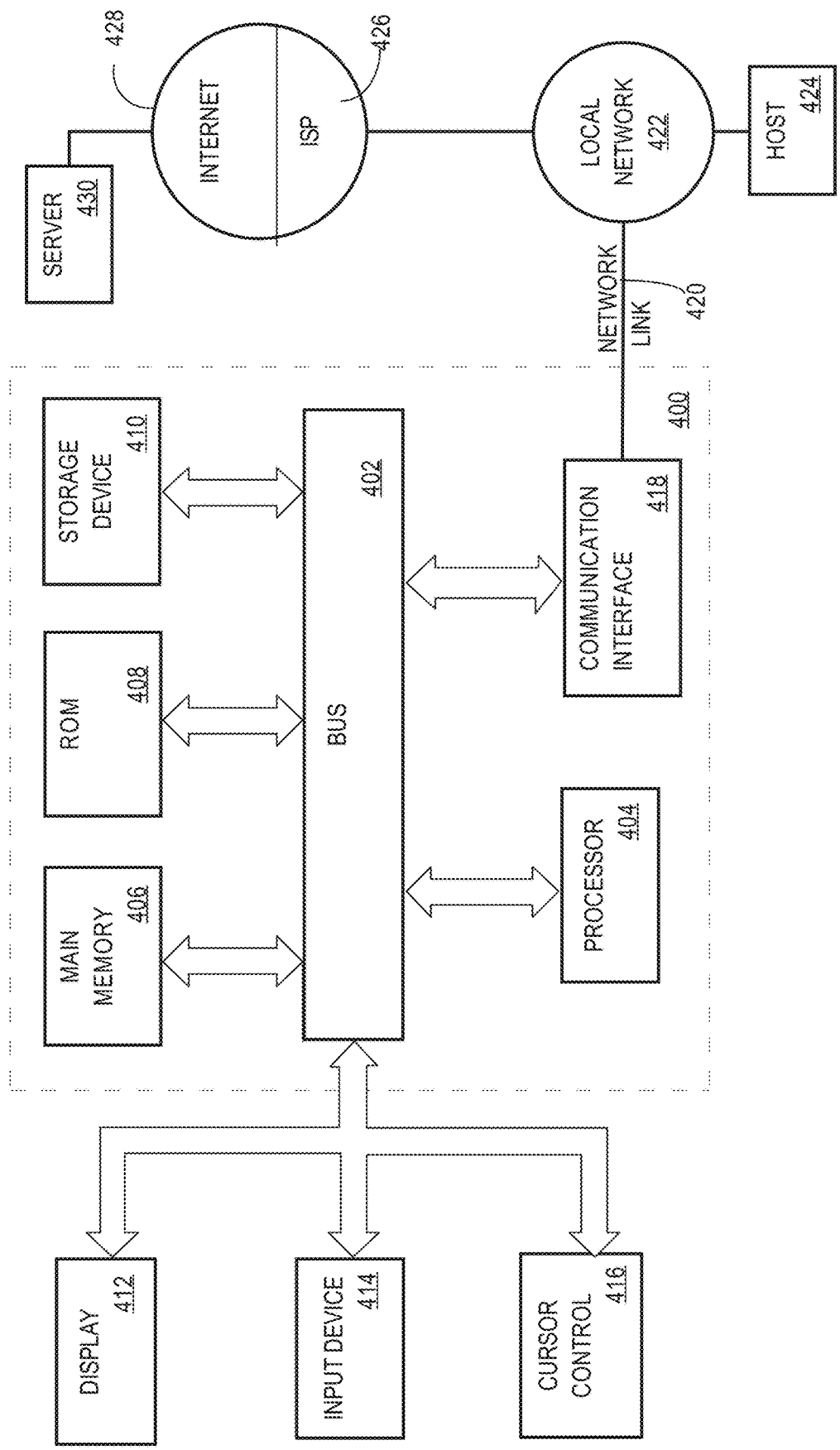
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
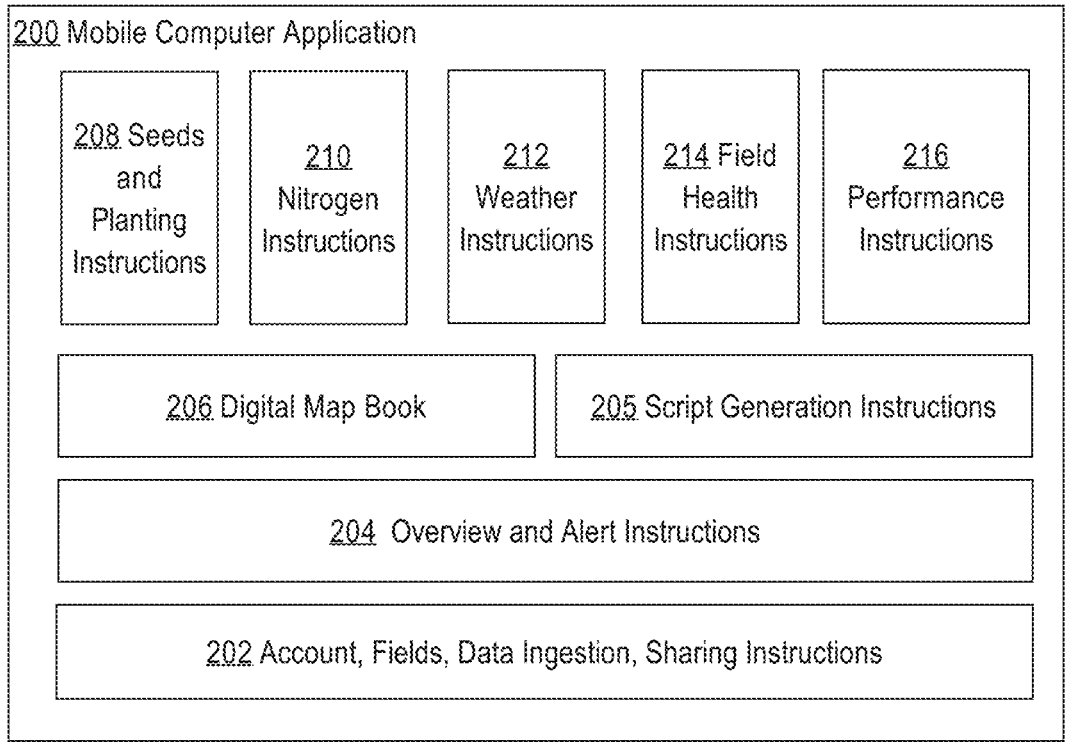
FIG. 2 illustrates two views of an example logical organization of sets of instructions in main memory when an example mobile application is loaded for execution.
Figure 2:
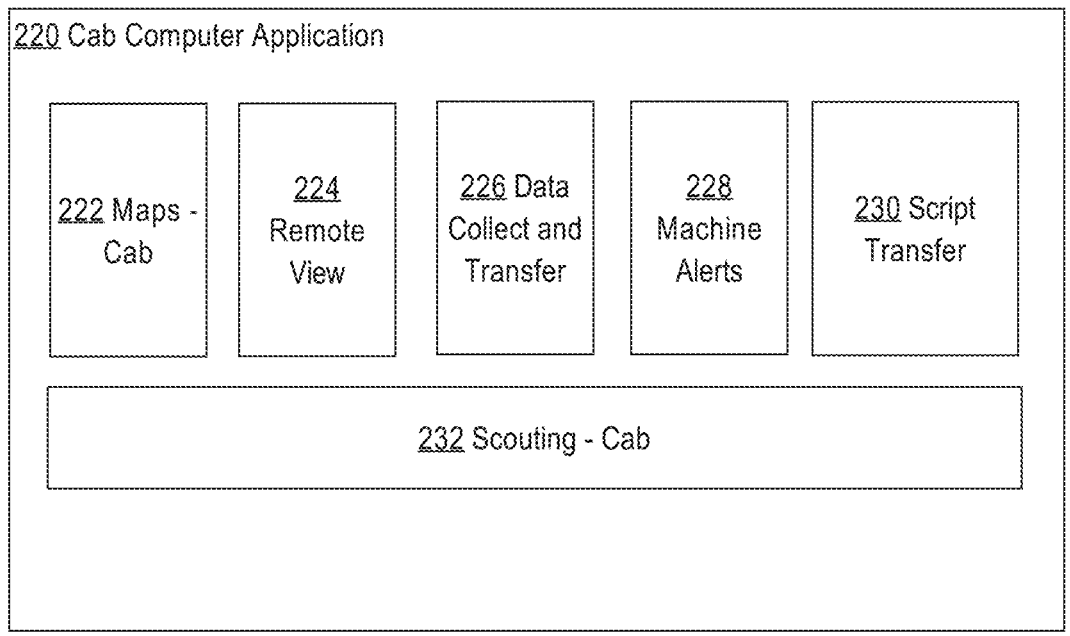

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US 2016/029609 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truth processing that compares predicted results with actual results on a field, such as a comparison of precipitation estimate with a rain gauge or sensor providing weather data at the same or nearby location or an estimate of nitrogen content with a soil sample measurement.

Figure 3:
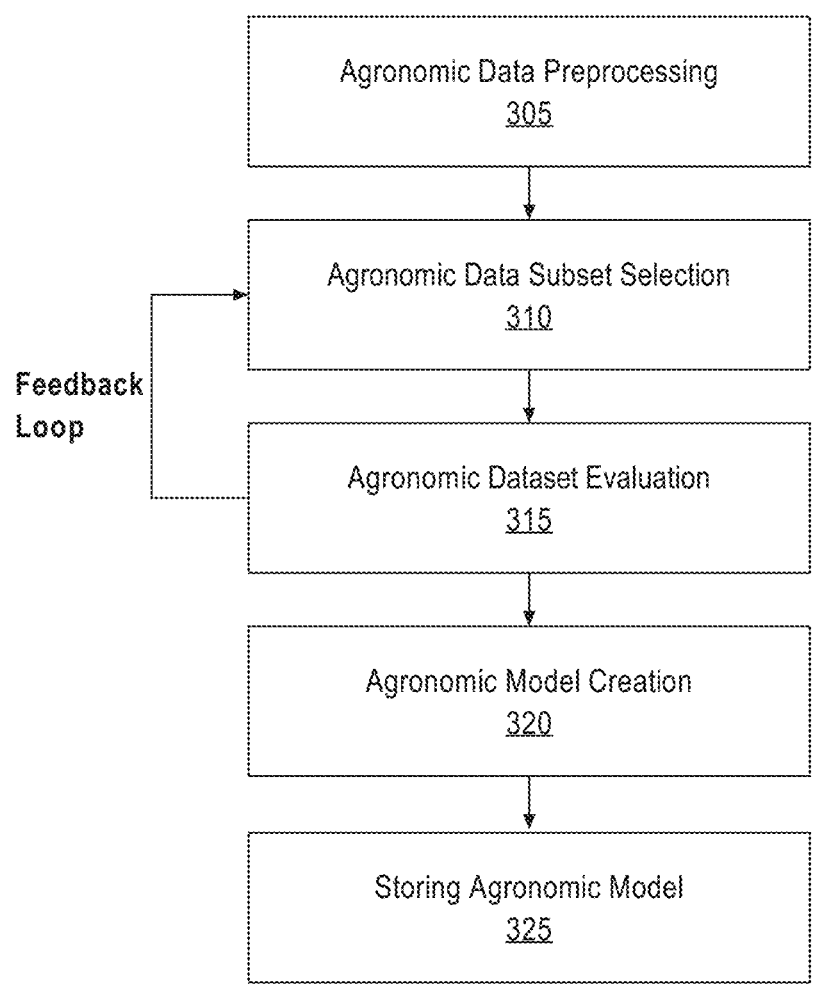
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Determining an Optimized Fertilizing Schedule

Yield obtained from an agricultural field depends on various factors such as weather, soil characteristics, quality of seeds, agricultural practices, fertilization schedules, and others. While some factors, such as weather and soil characteristics, may be difficult to control, other factors, such as fertilization schedules, can be controlled at least to some degree. One can control for example, the timing when fertilizer is applied to the field and the amount of fertilizer that is applied each time to the field. Indeed, the timing and quantity of fertilizer applied to the field may impact the amount and quality of crop harvested from the field, and that in turn may impact profits and yield.

In an embodiment, a process for determining an optimal fertilizer amount and an optimal timing for applying fertilizer to an agricultural field to maximize a particular variable, such as predicted profits, is disclosed. Determining the optimal timing for applying fertilizer to a field may include determining whether to apply fertilizer to the field during a crop pre-planting season, a side-dressing season, or both seasons. The pre-planting season usually starts before crops are planted in the field. The side-dressing season usually starts after the crops are planted. The optimization in this context means maximizing predicted profits while minimizing costs involved in growing, fertilizing, harvesting and selling crops. The costs may include a cost of fertilizer, a cost of labor involved in growing crop, a cost of labor involved in producing yield, and so forth.

In an embodiment, predicted profit derived from crop potentially harvested from an agricultural field is computed as a difference between a value of the predicted yield and a cost of fertilizer and labor involved in producing the yield. Other costs, such as an amortization cost of equipment used to cultivate the field, crop harvesting costs, shipping costs, and administrative costs, may also be included in the calculation.

In the context of generating an optimized schedule for fertilizing an agricultural field, one goal may be to maximize end-of-the-season profit, which may comprise the revenue gained from selling the harvested crop at the end of the season minus the fertilizer application fixed cost, as well as other costs involved in producing yield. Some of the costs may be fixed costs such as the cost of turning on the equipment, cost of labor, and the like. Other costs may be non-fixed. These may include the cost of fertilizer, seeds, and the like.

In an embodiment, for the purpose of determining an optimized schedule for fertilizing an agricultural field, at least some of the non-fixed costs are approximated using fixed amounts. The approximation is allowed as long as it does not affect the methodology for determining the schedule.

In an embodiment, a process for determining an optimized schedule for fertilizing an agricultural field includes determining recommendations for optimal fertilizer amounts and the dates when the optimal fertilizer amounts are to be applied. The dates may include the dates during a pre-planting season, a side-dressing season, or both.

In an embodiment, an approach determines a fertilizing schedule for an agricultural field to maximize a profit value. A fertilizing schedule may include one or more recommended dates for fertilizing an agricultural field and recommended amounts of the fertilizer to be applied on the recommended dates, respectively, to maximize profits expected from crops harvested from the field. The recommended dates are selected as valid calendar dates and may represent dates during a pre-planting season and/or a side-dressing season. For example, the dates may include one or more dates at the start of the sixth vegetative (V6) phenology stage, and/or one or more dates at the end of the eight vegetative (V8) stage, and/or the last date of the least possible application time provided by a grower. The recommended dates in an optimal schedule for fertilizing the field may also be determined based on two of any of the above listed dates as a rounded average of the two dates.

In an embodiment, recommended amounts of fertilizer are non-negative and may be generated based on weights of fertilizer packages available to growers. For example, they may be expressed using any amount from the set {10, 20 ... 170, 180} where integers are pounds in this example.

For purposes of illustrating clear examples using the means and terminology that is customary for persons of ordinary skill in the art to which this disclosure pertains, mathematical equations are used in part of the description. The nature of the disclosure is that improvements in this field are expressed functionally, and in mathematical terms, in the customary communications between people of skill in the art. Each mathematical equation or expression that is described herein is intended to represent all or part of a computational algorithm that can be implemented using a computer, and is intended to be implemented using technical means, such as a programmed computer, software application, firmware, hardware logic or a combination thereof and the disclosure is directed to improved technical means for carrying out the functions that are described herein.

In an embodiment, an approach for determining a fertilizing schedule for an agricultural field to maximize profits is implemented in a software application. The application may be a standalone application executed on a computer server, a computing device, a smartphone or other electronic device. The application may be implemented as an extension to Nitrogen Advisor, commercially available from The Climate Corporation, San Francisco, Calif. The application may be configured to provide a wide range of flexibility in terms of determining optimal dates for applying fertilizer and determining optimal amounts of fertilizer to be applied in order to optimize profits derived from the harvested crops.

The algorithmic optimization process disclosed herein has relatively low computational complexity and may be implemented in program code that is optimized in terms of using computational resources, such as power, time, storage resources, and bandwidth.

3.1 Predicted Profits

In an embodiment, predicted profit derived from cultivating and harvesting crops in an agricultural field is computed as a difference between a value of the predicted yield and a cost of producing the yield. In one example approach for computing predicted profit, assume that $p_c$ denotes a predicted price of a bushel of crop harvested from an agricultural field in a particular harvest season. The predicted price may be expressed using any type of monetary value or currency. Because prices may fluctuate from season to season, the predicted price of a bushel of crop may be individually determined for each harvesting season.

Let y denote a predicted yield that is harvested from an agricultural field in a particular harvest season. The predicted yield may be expressed in bushels or any other applicable unit of measure. Let $c_f$ denote a cost of fertilizer applied during a particular harvest season, $x_f$ denotes amount of fertilizer applied to the field during the particular harvest season, and $c_l$ denotes cost of labor involved in fertilizing and/or cultivating the field. With these assumptions, predicted profit derived from harvesting crops from the agricultural field may be computed by computer as:

$$\text{Profit} = p_c * y - c_f * x_f - 1_{(x_f > 0)} * c_l \quad (1)$$

The function "$1_{(x_f > 0)} * c_l$" means that, if fertilizer is applied, and thus the amount of fertilizer $x_f$ is greater than 0, then the cost $c_l$ of labor involved in fertilizing and/or cultivating the field is greater than 0, and thus the cost $c_l$ of labor is used in computing the predicted profit.

3.2 Optimization Constraints

In an embodiment, while searching for optimal dates for applying fertilizer to a field, an algorithm or process implements constraints and restrictions. For example, the process may prevent recommending applying fertilizer on non-existing calendar dates, such as May 32. The process may also prevent recommending applying fertilizer in negative quantities, or quantities that are unavailable from retailers. Furthermore, the process may generate specific instructions for avoiding applying a specific type of fertilizer or avoiding applying fertilizer in a specific manner. For example, if anhydrous ammonia is recommended as fertilizer for a particular field, then the process may generate recommendations to avoid applying the anhydrous ammonia too close to the planting date because this type of fertilizer may damage seeds.

3.2.1 Decision Variables

In one optimization approach, a decision variable is digitally stored quantity that a decision-maker may control. A decision variable is a variable that can be controlled, for example, to manipulate or manage the behavior of an optimization model. Usually decision variables are determined by an optimization model or a user.

In an embodiment, decision variables include two types of variables: a first type of decision variables is used to indicate specific amounts of specific fertilizer to be applied to the field; a second type includes variables that indicate dates on which the specific amounts of the specific fertilizer are to be applied.

In an embodiment, decision variables are used to indicate amounts of fertilizer and respective dates at which the amounts of the fertilizer are to be applied to a field. For example, if two amounts and two dates are used, then the first and second application amounts of fertilizer may be denoted $x^1_f$ and $x^2_f$, respectively, and their respective dates may be denoted $d_1$ and $d_2$. The two decision variables for the amounts of fertilizer may also be represented as $x^i_f$, where i belongs to a set={1, 2}, and where $x^i_f$ corresponds to the i-th amount of fertilizer. Furthermore, the two decision variables that correspond to the dates may also be represented as $d_i$, where i belongs to a set={1, 2}, and where $d_i$ corresponds to the day of the i-th application of fertilizer.

3.2.2 Auxiliary Decision Variables

In optimization, an auxiliary decision variable is a decision variable that a decision-maker can determine in advance, or for which the values can be provided in advance. Examples of auxiliary decision variables include binary variables. In an embodiment, binary auxiliary decision variables are used to either include or exclude a cost of applications of fertilizer and/or to either include or exclude a cost of labor associated with applying the fertilizer. Binary auxiliary variables allow including or excluding for example, a cost of a fertilizer application applied to a field on a specific date, and/or including or excluding a cost of labor associated with applying the fertilizer on that date.

Let $z_i$ be a binary auxiliary variable that can be assigned either "0" or "1" as a value. Then:

$$z_i \in \mathbb{B} \text{ for } i \in \{1,2\} \qquad (2)$$

where $z_i$ denotes whether a fixed cost of the i-th application of fertilizer applied to an agricultural field is included in an optimization process. If no fertilizer is applied on i-th date of the two dates, then for i, the $x^i_f$, and $z_i$ are zero, so if no fertilizer is applied on i-th day, then the cost of fertilizer is not included in the optimization process.

In an embodiment, $z_i$ denotes whether a fixed cost of labor associated with i-th application of fertilizer to an agricultural field is included in an optimization process. If no fertilizer is applied on i-th date of the two dates, then for i, the $x^i_f$, and $z_i$ are zero. That means that if no fertilizer is applied on i-th day, then the labor cost of applying the fertilizer is not included in the optimization process.

In an embodiment, binary auxiliary decision variables are used to enforce the fixed costs when the amount of i-th application of fertilizer is greater than zero.

3.2.3 Optimization Parameters

In an optimization, an optimization parameter is a parameter which value is to be optimized without violating other constraints. In the context of generating an optimized schedule for fertilizing an agricultural field, one of the objectives is maximizing the end-of-the-season profit as function of the expected revenue, a cost of applied fertilizer, and a cost of labor associated with applying the fertilizer. In an embodiment, optimization parameters include:

$$\hat{\theta} \qquad (3)$$

which represents all fixed input parameters that are used to query a computer system on which the presented approach is implemented in order to obtaining an average yield value. Furthermore, let optimization parameters include:

$$d_i^{min} \text{ and } d_i^{max} \text{ for } i \in \{1,2\} \qquad (4)$$

which denote lower and upper bound date values of the fertilizer application dates.

Additional optimization parameters may include $p_c$, which denotes a price of harvested crop (per bushel), $c^i_f$, which denotes a cost of fertilizer of i-th application of fertilizer (in dollar amount), $c^i_l$, which is a cost of labor of applying fertilizer in i-th application (in dollar amount).

3.2.4 Maximizing Yields While Minimizing Cost

In an embodiment, a process allows determining a fertilizing schedule for an agricultural field in such a way that it maximizes expected yield harvested from the field while minimizing the cost of labor and the cost of fertilizer used in the field. The interdependencies between the expected yield and the cost of labor and fertilizer may be expressed as:

$$\max p_c \mathbb{E}(y|x^1_f, d_1, x^2_f, d_2, \hat{\theta}) - c^1_l z_1 - c^1_f x^1_f - c^2_l z_2 - c^2_f x^2_f \qquad (5)$$

such that:

$$d_1^{min} \leq d_1 \leq d_1^{max}$$

$$d_2^{min} \leq d_2 \leq d_2^{max}$$

$$x^1_f \leq M z_1$$

$$x^2_f \leq M z_2$$

$$z_1, z_2 \in \mathbb{B}$$

$$d_1, d_2 \in \mathbb{Z}_+$$

$$x^1_f, x^2_f \in \mathbb{R}_+, \qquad (6)$$

where $p_c$ denotes the price of a crop (such as corn) in dollars per bushel, $c^i_l$ and $c^i_f$ for i={1, 2}, respectively, represent the fixed cost of labor and the fixed cost of fertilizer of the i-th application in dollar amounts, and $\hat{\theta}$ represents all the fixed input parameters when querying the system in order to obtain the average yield. M is a large positive scalar that can be fixed to an appropriate upper bound date value for the first and second fertilizer amount. $z_i$ for i={1, 2} are auxiliary binary variables from the set B={0, 1}. The remaining parameters have been defined above.

In an embodiment, the parameters used in expressions (5)-(6) are designed to be versatile and can be assigned different values depending on the type of fertilizers used. For example, the variables may be used to enforce the fixed costs when the amount of i-th application is greater than zero. That is, if $x^i_f > 0$ is the optimal solution for i from the set={1, 2}, then the corresponding $z_i$ may be assigned the value of 1 in order to satisfy the corresponding constraint $x_i \leq M z_i$.

In an embodiment, expression (5) represents an objective function that takes into account an expected profit from selling the crop harvested from a particular agricultural field, the fixed and/or variable costs of fertilizer application, and the fixed and/or variable cost of labor associated with applying the fertilizer to the field.

In an embodiment, the term $c^i_l * z_i$ in the objective function represents the fixed cost associated with the i-th application of fertilizer to a field.

In an embodiment, $d_1$ and $d_2$ constraints in expression (5) represent the bounds on the dates of applications of fertilizer. They may include lower and upper bound date values of the fertilizer application dates. For example, $d_1$ may range from the end of the harvest in fall until the day of planting for most types of fertilizers, while $d_2$ may range from a few days after planting crops until the beginning of the V10 growth stage.

In an embodiment, $x_1^f$ and $x_2^f$ constraints are used to guarantee that a cost of labor is enforced when a respective positive amount for the fertilizer is selected.

3.3 Penalty Function

In an embodiment, a process for generating an optimized fertilization schedule that maximizes profits expected from a field while minimizing costs associated with growing crop in the field uses expression (5) that is modified using a particular penalty function. A particular penalty function is used to modify expression (5) to overcome shortcomings of expression (5) in terms of validity of recommendations that are included in the generated fertilization schedule. A fertilization schedule generated by implementing expression (5) but without the particular penalty function could provide recommendations that would make no sense. For example, such recommendations could suggest applying a fertilizer on non-existing days, such as May $32^{nd}$, or applying negative amounts of fertilizer.

Expression (5) may pose challenges for generating valid optimized fertilization schedules because expression (5) has no closed-form expression or gradient information for the expected yield function. Solving an optimization problem may require using a black-box optimization algorithm. However, most of the time, such algorithms are unable to handle constraints including the non-negativity of variables, such as non-negative amounts of fertilizer, and/or discrete nature of variables, such as valid calendar dates. For example, the algorithms such as the Derivative Free Optimization (DFO) algorithm may be applicable to unconstrained and continuous variables, but not to discrete variables. This difficulty may be overcome by defining and implementing a particular penalty function.

In an embodiment, a penalty function is a nonlinear function defined to impose constraints on variables, parameters and values used in expression (5). An example of a penalty function is a quadratic penalty function; however, a higher degree penalty function may also be implemented. In some implementations, higher degree penalty functions, such cubic or quartic penalty functions may be used as penalty functions in expression (5).

A quadratic penalty functions, as opposed to a linear function, provides more control over the terms included in expression (5). For example, a quadratic penalty function is more useful than a linear penalty function in enforcing some smoothness to the objective function expressed using expression (5).

In an embodiment, a quadratic penalty term is added to expression (5). A quadratic penalty term may be used to bound constraints on dates at which fertilizer is applied to a field. A quadratic penalty term may bound the constraints on the dates by generating and applying a penalty term to expression (5) to penalize violations on the bound on the dates.

Since expression (5) includes at least some parameters expressed using discrete values, introducing a quadrating penalty term may allow enforcing some smoothness to an objective function in expression (5). Controlling the smoothness is desirable to approximate the gradients of for example, discrete values of certain parameters in expression (5), such as recommended dates for applying fertilizer to a field. Controlling the smoothness of certain parameters in expression (5) is also desirable in building surrogate models internally.

In an embodiment, a quadratic penalty term may be used to enforce non-negativity constraints of some parameters in expression (5). Incorporating a quadratic penalty term in expression (5) may be used to guarantee the positivity of variables used in expression (5). For example, a quadratic penalty term may guarantee the positivity of $d_1$ and $d_2$ constraints in expression (5) that represent the bounds on the dates of applications of fertilizer to a field.

In an embodiment, an implementation of a penalty term to a process for generating an optimized fertilizing schedule for an agricultural field includes defining a basic objective function. An example of such a basic objective function includes expression (5). Then, a penalty term requiring a fixed cost of a fertilizer application is added to the base function to ensure that the fertilizer amount of that application is positive. To provide discrete solutions for the dates, another penalty term is added to specify an approximation and rounding of the dates to respective closest calendar dates.

In an embodiment, a quadratic penalty function is defined as:

$$\mathcal{H}(d_1, d_2) = \sum_{i=1}^{2} \{\lambda_i u_i (d_i^{min} - d_i)^2 + \gamma_i w_i (d_i - d_i^{max})^2\} \quad (7)$$

where $\lambda_i$ and $\gamma_i$ for $i=\{1, 2\}$ are positive scalars representing the penalty associated respectively with lower and upper bound date value violations; and where $d_i^{min} \leq d_i + M'u_i$, $i=1,2$ $d_i \leq d_i^{max} + M'w_i$, $i=1,2$ $x_f^i \leq Mz_i$, $i=1,2$ $z_i, u_i, w_i \in \mathbb{B}$, $i=1,2$ $x_f^i \in \mathbb{R}_+$, $i=1,2$ $d_i \in \mathbb{Z}_+$, $i=1,2$,  $\quad(8)$ where M' is an appropriately chosen positive scalar, such M'$-d^{max}_2$, and is used to regulate the binary variables in the first two constraints pertaining to dates. When no violations with regard to discrete variables and/or non-negative variables take place, the two constraints ($d_1$ and $d_2$ constraints that represent the bounds on the dates for applying fertilizer to a field) become redundant. However, if at least one violation of the constraints takes place, then one or more corresponding penalty terms in the H function become effective by fixing the value of the associated binary variable to 1.

3.4 Example Implementation of a Penalty Function

In an embodiment, a process for determining a fertilizing schedule for an agricultural field uses a penalty function for penalizing constraints violations on the dates and fertilizer amounts. The process maximizes expected yields harvested from the field while minimizing costs by introducing a quadratic penalty term to penalize constraint violations on the fertilizing dates and fertilizer amounts.

The interdependencies, augmented using a quadratic penalty functions, between the expected yields and the cost of labor and fertilizer may be expressed as:

$$\max p_c \mathbb{E}(y|x_f^1, d_1, x_f^2, d_2, \hat{\theta}) - c_l^1 z_1 - c_f^1 x_f^1 - c_l^2 z_2 - c_f^2 x_f^2 - \mathcal{H}(d_1, d_2) \quad (9)$$

such that:

$$d_i^{min} \leq d_i + M'u_i, \quad i=1,2$$

$$d_i \leq d_i^{max} + M'w_i, \quad i=1,2$$

$$x_f^i \leq Mz_i, \quad i=1,2$$

$$z_i, u_i, w_i \in \mathbb{B}, \quad i=1,2$$

$$x_f^i \in \mathbb{R}_+, \quad i=1,2$$

$$d_i \in \mathbb{Z}_+, \quad i=1,2, \tag{10}$$

In an embodiment, a process for determining a fertilizing schedule for an agricultural field that is augmented using a penalty function allows generating fertilizing recommendations that are discrete and non-negative. For example, the process may be designed in such a way that the fertilizing schedule can provide one or more dates that are expressed as non-negative, valid, calendar dates. Furthermore, the process may be designed in such a way that the fertilizing schedule will provide one or more fertilizer amounts that are non-negative, valid amounts. The validity of the recommended fertilizer amount may be further tested against a set of weights of bags containing fertilizer and distributed by fertilizer retailers.

In an embodiment, a process for determining a fertilizing schedule for an agricultural field uses a penalty function to ensure that the schedule includes recommendations maximizing a non-negative profit. This may be implemented by assigning a low yield level, such as 50 bushels per acre or so, as the average yield in the objective function in expression (9), and associating a quadratic penalty term that is proportional to the violation.

In an embodiment, a process for determining a fertilizing schedule for an agricultural field uses a penalty function to ensure that the schedule includes recommendations for the dates for applying the fertilizer and the recommended amounts of fertilizer that are expressed using discrete values. To guarantee that the recommended dates and amounts are expressed using discrete values, an approximation approach may be implemented. For example, the values may be rounded down to the respective close integer values, and the rounded values may be returned as recommendations.

In an embodiment, in addition to determining valid dates for applying fertilizer to a field and valid amounts of the fertilizer for the field, the process tests other parameters and variables. For example, some binary variables used in expression (9) may be subjected to an if-then test used to ensure that values of the variables are valid.

In an embodiment, values of the coefficient used in a penalty function are selected according to certain criteria. The values of the coefficient may be selected for example, to avoid deriving the recommendations that are unrealistic. In particular, the coefficients may be selected to avoid "shooting" the solution too far. This may be applicable to the implementation of the approximation algorithms as well as the implementation of the number rounding algorithms.

3.5 Generating an Optimized Fertilizing Schedule

3.5.1 Example Computing Environment

Figure 7:
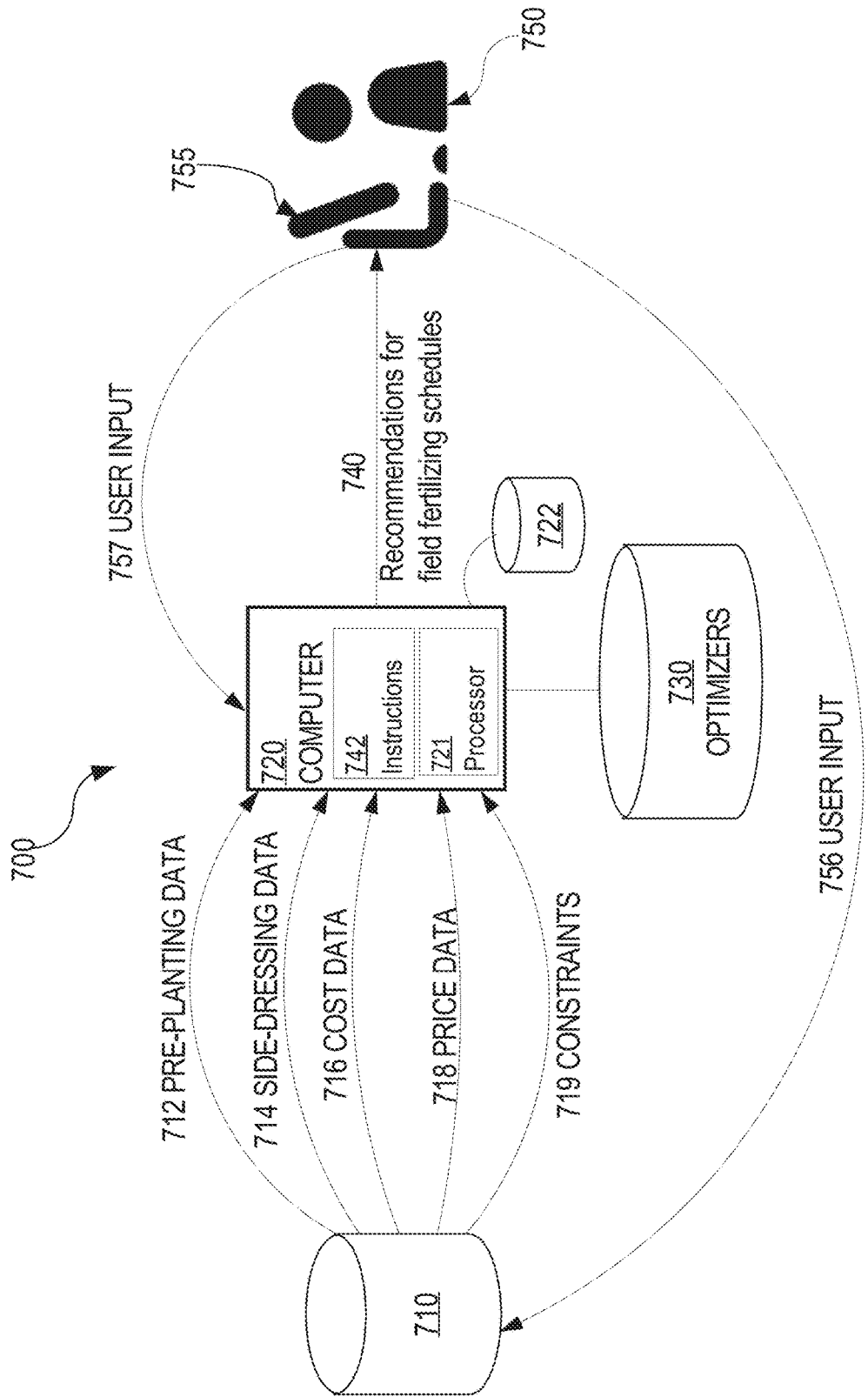
FIG. 7 depicts an example electronic data processing computer system configured to generate an optimized fertilization schedule for fertilizing an agricultural field to maximize profits while minimizing costs.

FIG. 7 depicts an example electronic data processing computer system configured to generate an optimized fertilization schedule for fertilizing an agricultural field to maximize profits while minimizing costs. In the depicted example, electronic data processing computer system 700 comprises a computer device 720, a data server 710, a data server 722, and an application server 730. Application server 730 may be configured to provide optimizers and other software applications to computer device 720. Examples of optimizers may include trust-region based optimizers, directional direct-search optimizers, simplicial direct-search optimizers, and others.

Computer system 700 may be used by one or more users of computer device 720, by one or more users 750 of one or more user workstations 755, or both. Users 750 may be crop growers, for example. If computer system 700 is implemented without providing connectivity to a user workstation 755, then output generated by computer device 720 may be stored in a storage device such as data server 710 or data server 722.

However, if computer system 700 is implemented to provide connectivity to user workstation 755, then instructions from user workstation 755 may be transmitted to computer device 720, and output generated by computer device 720 may be transmitted to user workstation 755. Data exchange between user workstation 755 and computer device 720 may be facilitated by a graphical user interface (GUI) generated by user workstation 755 and communicating with computer device 720.

In an embodiment, computer device 720 is any type of electronic device configured to receive and process electronic data. Computer device 720 may comprise one or more computer processors 721 configured to execute program instructions 742 that may be stored in one or more memory units or one or more data servers 722 and then loaded into memory accessible to processors 721. In an embodiment, instructions 742 comprise one or more computer programs, libraries, or other software elements that are programmed in accordance with the mathematical equations, variables and relationships that have been described in the preceding sections. Each of the variables described above may be digitally stored in computer memory and read, transformed and written under program control to produce output data or results that are also digitally stored in memory and/or in data storage.

In an embodiment, computer device 720 executes instructions 742 that cause computer device 720 to receive data from data server 710, data server 722, user workstation 755, and/or application server 730. Examples of the received data may include pre-planting data 712, side-dressing data 714, cost data 716, price data 718, constraints 719, and other types of data. Different types of the received data are described above.

Data 712-719 may be provided to data server 710 by a user of computer device 720 or by user 750 who provided user input 756. Data 712-719 may also be provided to data server 722 by a user of computer device 720 or by user 750 who provided user input 757.

In an embodiment, computer device 720 is configured to receive data 712-719, and process the received data to generate an optimized fertilization schedule for applying fertilizer to an agricultural field to maximize profits obtained from yield while minimizing costs of growing crop in the field.

An optimized fertilization schedule may be provided in form of recommendations 740. An example process of generating the optimized fertilization schedule is further described herein with reference to FIG. 8.

3.5.2 Example Process

Figure 9:
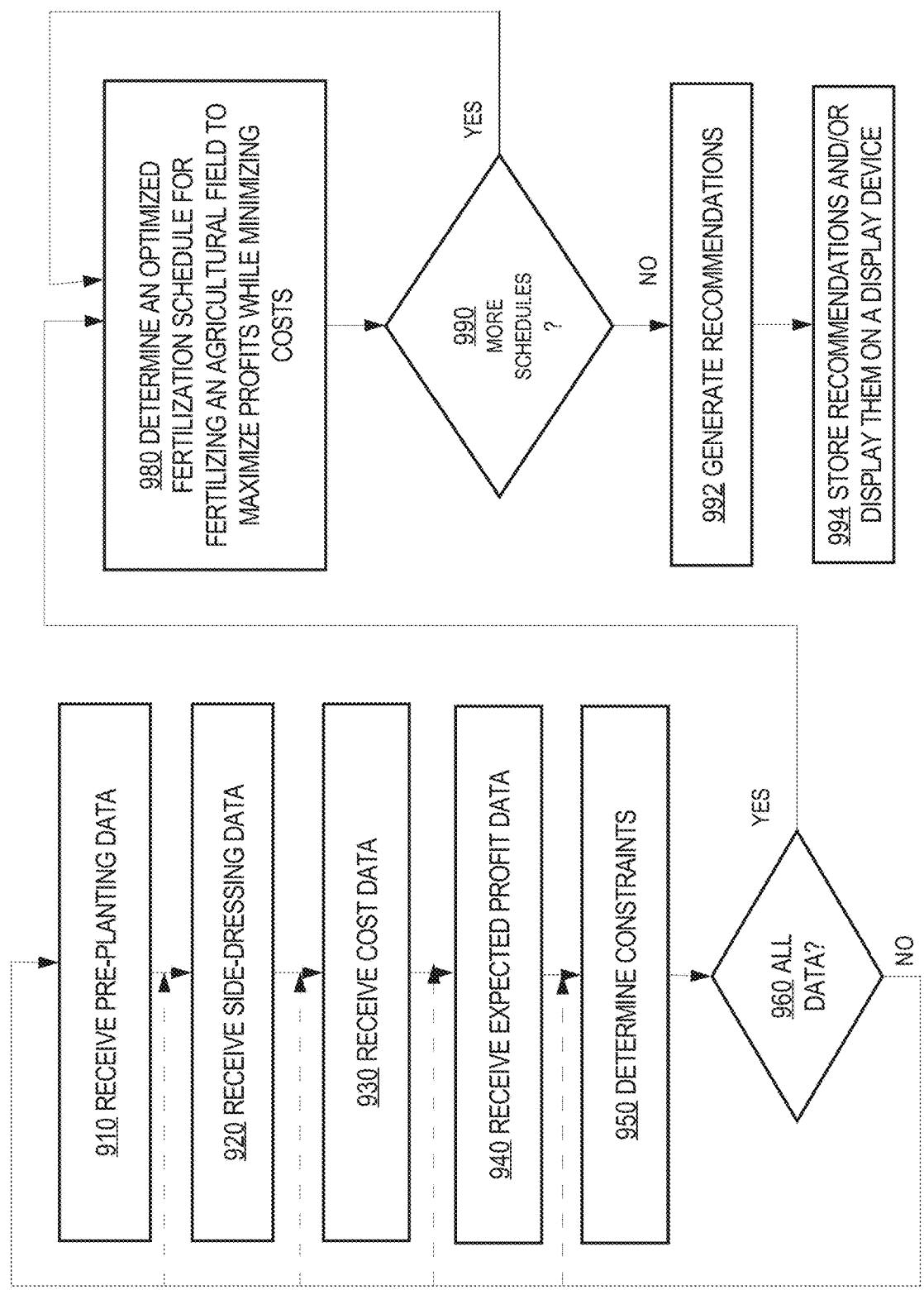
FIG. 9 depicts a method for generating an optimized fertilization schedule for fertilizing an agricultural field to maximize profits while minimizing costs.

FIG. 9 depicts a method for generating an optimized fertilization schedule for fertilizing an agricultural field to maximize profits while minimizing costs. FIG. 9 represents an algorithm that is described functionally here and at the same level of detail that is customarily used by persons of skill in the art to which this disclosure pertains for communicating plans for computer programs, software applications or other technical implementations of mathematical relationships, variables, transformations and output.

To initiate the process, a user may launch, on computer device 720, a software application configured to generate an optimized fertilizing schedule for an agricultural field. Then, the user may be prompted to provide data to computer device 720, or to indicate the sources from which computer device 720 can receive or retrieve data. The software application may also be launched on or from user workstation 755.

In step 910, computer device 720 receives pre-planting data. Pre-planting data may represent a lower bound date value and an upper bound date value of dates for a pre-planting application of fertilizer to an agricultural field.

In step 920, computer device 720 receives side-dressing data. Side-dressing data may represent a lower bound date value and an upper bound date value of dates for a side-dressing application of fertilizer to the agricultural field.

In step 930, computer device 720 receives cost data. Cost data may include fertilizer cost data representing a cost of a fertilizer application and labor cost data representing a cost of applying fertilizer to the agricultural field.

In step 940, computer device 720 receives expected profit data that are predicted based on crop expected to be harvested from a field. Expected profit data may represent a difference between the value of the produced and sold crop and the costs of producing and shipping the crop. The value of the produced and sold crop may be computed for example, as a product of the price of one bushel of crop and a count of bushels of crop that are expected to be sold. The cost of producing the crop may be computed for example, as a sum of costs and expenditures associated with growing, fertilizing, cultivating and shipping the crop.

In step 950, one or more constraints for a penalty function are determined. A penalty function may be a quadratic penalty function or any higher degree penalty function. Determining one or more constraints for the penalty function may include defining values for constraints, values for decision variables, values for auxiliary variables, and values for optimization parameters of the penalty function. The values may be defined manually or automatically.

In an embodiment, user of computer device 720 or user 750 may be prompted to enter values for the constraints. In response to the prompts, the user may manually provide user input 757 containing the initial values.

In an embodiment, values for the constraints are defined and initiated automatically based on the values determined in advance and stored in data server 710 and/or data server 722.

In an embodiment, values for the constraints are computed based on, at least in part, the pre-planting data, the side-dressing data, the fertilizer cost data, the labor cost data, and the expected profit data.

In an embodiment, values for the constraints specify one or more conditions for determining one or more valid calendar dates and one or more valid fertilizer amounts.

In an embodiment, one or more penalty values are determined based on one or more of: the lower bound date value and the upper bound date value of dates for the pre-planting application of fertilizer to the agricultural field, the lower bound date value and the upper bound date value of dates for the side-dressing application of fertilizer to the agricultural field, or a set of non-negative valid amounts of fertilizer.

In an embodiment, one or more penalty constraints are used to determine whether to include, in determining a fertilizing schedule, one or more of: a cost of applying fertilizer to the agricultural field on a particular date, or a cost of a particular amount of fertilizer applied to the agricultural field at the particular date.

In an embodiment, one or more penalty constraints are used to determine whether to include, in determining a fertilizing schedule, one or more of: a cost of labor associated with applying fertilizer to the agricultural field at a particular date, a cost of labor associated with harvesting crop from the agricultural field, or an amortization cost of equipment used to apply fertilizer to the agricultural field on the particular date, or an amortization cost of equipment used to harvest crop from the agricultural field.

In step 960, a test is performed to determine whether all data for determining an optimized fertilizing schedule for a field has been initiated and/or provided to computer device 720. If all the data has been provided and/or initiated, then step 980 is performed. Otherwise, additional data is requested and one or more steps 910-950 are repeated.

In step 980, computer device 720 determines an optimized fertilization schedule for fertilizing an agricultural field to maximize profits while minimizing costs. An optimized fertilization schedule may provide one or more recommended dates for applying fertilizer to the field, and the amounts of fertilizer to be applied at the respective recommended dates. An optimized fertilization schedule may also provide recommendations with respect to the type of fertilizer to be used on the recommended dates, and any additional instructions related to applying the fertilizer to the field.

In an embodiment, an optimized fertilization schedule includes at least one date that falls in a pre-planting season.

In an embodiment, an optimized fertilization schedule includes at least one date that falls in a side-dressing season.

In step 990, a test is performed to determine whether any additional optimized fertilizing schedules are requested. If additional schedules are requested, then step 980 is repeated. Otherwise, step 992 is performed.

In an embodiment, a process for determining fertilizing schedules is configured to generate a plurality of schedules for one or more agricultural fields. If the process is configured to generate a plurality of schedules, then step 980 is performed for each schedule of the plurality of schedules.

In an embodiment, the process may be configured to generate two or more alternative schedules for fertilizing a particular field, two or more alternative schedules for fertilizing one or more fields, and/or two or more schedules for fertilizing any set of the one or more agricultural fields.

In step 992, computer device 720 generates recommendations based on one or more optimized fertilizing schedules. An example recommendation is described in FIG. 8.

In step 994, computer device 720 stores recommendations generated based on one or more optimized fertilizing schedules. The recommendations may be stored in any data storage device, including data server 710 and data server 722. In some situations, both the recommendations and the schedules are stored. In other situations only the recommendations, or only the schedules are served.

In an embodiment, computer device 720 causes transmitting the recommendations and/or schedules to user device 755, and causes displaying the recommendations and/or schedules on a display device of user device 755.

In an embodiment, user device 755 may generate a GUI configured to allow a user to modify the settings and initial values used by a process for determining a fertilizing schedule. The GUI may be configured to for example, allow a user to modify values of any constraints or variables, modify the cost values, modify definitions of the fields for which the fertilizing schedules are requested, and the like.

In an embodiment, a process for determining a fertilizing schedule for an agricultural field that is augmented using a penalty function may be implemented using a GUI managed by computer device 720, and may allow bi-directional communications with user workstations 755.

3.5.3 Example Recommendations

Figure 8:
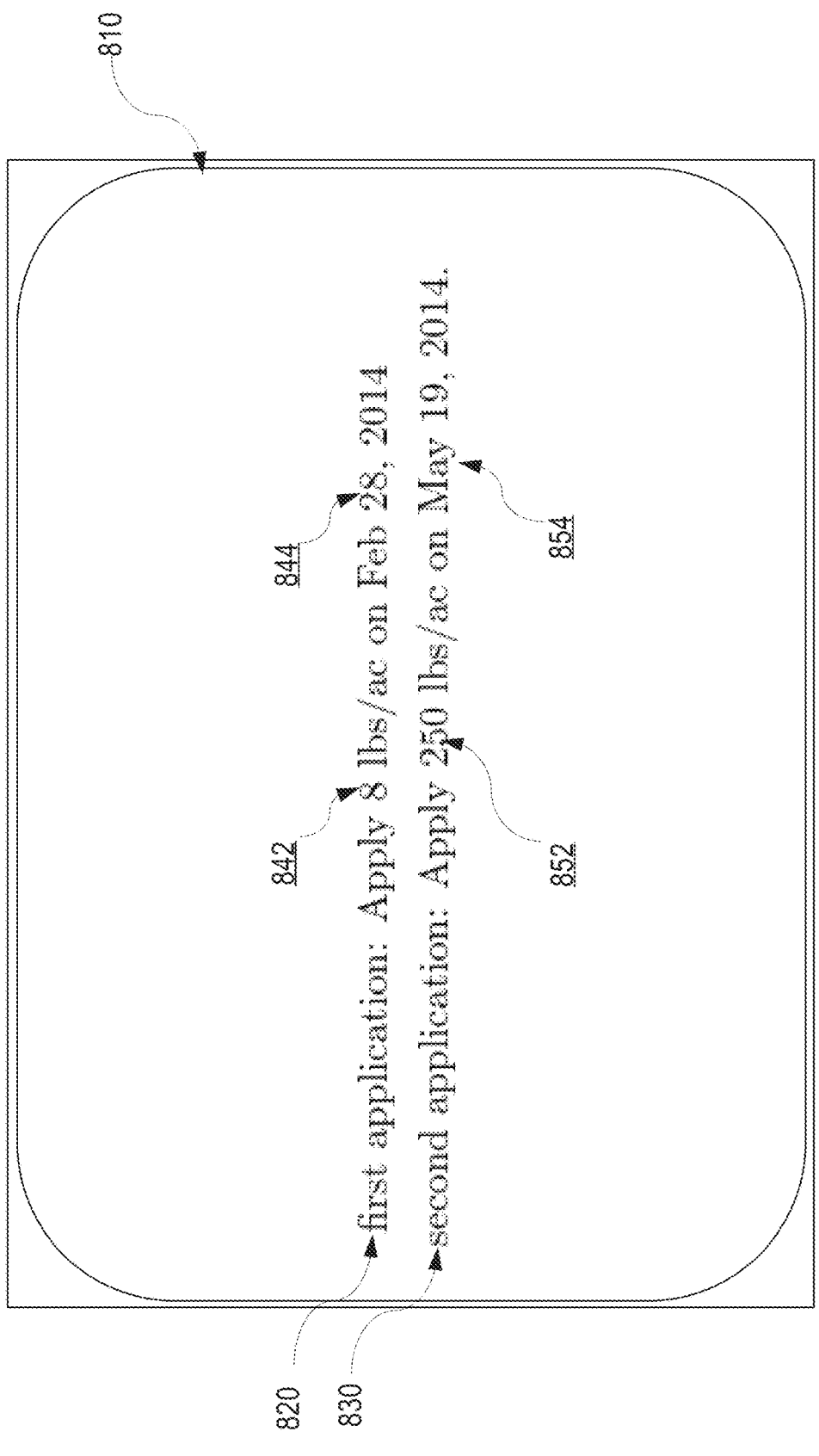
FIG. 8 depicts example recommendations for an optimized field fertilizing schedule for fertilizing an agricultural field to maximize profits while minimizing costs.

FIG. 8 depicts example recommendations for an optimized field fertilizing schedule for fertilizing an agricultural field to maximize profits while minimizing costs. In the depicted example, recommendations 810 include recommendations 820 and recommendations 830. Recommendations 820 pertain to fertilizing instructions during a pre-planting season, while recommendations 830 pertain to fertilizing instructions during a side-dressing season. Recommendations 810 may be interpreted as follows: to obtain the highest possible profits from harvesting crop from a particular agricultural field in 2014, it is recommended that fertilizer be applied twice per year: specifically, it is recommended that the first application included 8 pounds per acre of fertilizer (element 842) and took place on Feb. 28, 2014 (element 844), and that the second application included 250 pounds per acre (element 852) and took place on May 19, 2014 (element 854).

In the depicted example, recommendations 810 include the recommendations for applying fertilizer during both a pre-planting season (February) and a side-dressing season (May). Other recommendations may suggest applying fertilizer only during a side-dressing season. In fact, it has been shown that applying fertilizer during a side-dressing season may contribute to receiving higher profits than if fertilizer was applied twice a year or than if fertilizer was applied only during a pre-planting season.

In an embodiment, recommendations include indications of the type of fertilizer that, if applied to a field, may contribute to receiving higher profits than if other type of fertilizer is used. For example, recommendations may include a suggestion to use fertilizer that includes ammonium-nitrate.

In an embodiment, a process for determining fertilizing schedules is configured to generate recommendations for a plurality of agricultural fields. For example, for each of the plurality of fields, a separate set of recommendations may be generated, and a particular set of recommendations may include an indication of the type of fertilizer to be used, the dates for applying the fertilizer and the amounts of the fertilizer recommended for a particular field.

4. Benefits of Embodiments; Extensions

In an embodiment, a presented approach provides many benefits that are not obtainable using other approaches including the Nitrogen Advisor. The approach herein may be configured to generate recommended dates for fertilizing a field and generate specific amounts of fertilizer to be applied on each of the dates, while other approaches select, not generate, fertilizing dates or fertilizer amounts from predetermined data sets. Furthermore, the presented approach may determine recommendations that include more than three dates for a pre-planting season, and/or more than three dates for a side-dressing season, while other approaches consider only three dates for applying the fertilizer for the entire year.

In an embodiment, a process for optimizing a field fertilizing practice utilizes optimization algorithms that can be represented as a black box. The representation provides an important versatility to the approach because the process can be easily upgraded by replacing one optimization algorithm in the black box by another. The process can also be easily modified by replacing one optimization algorithm in the black box by a modified version of the same algorithm.

In an embodiment, an approach may be enhanced using optimal solutions for determining an optimal timing for applying fertilizer on various dates during a pre-planting season and various dates during a side-dressing season. It appears that the risk of applying fertilizers during the side-dressing phase, during which the crop is already grown, is relatively high. For example, applying the fertilizers during the side-dressing phase may cause some damage to the crop. Furthermore, timing the application of the fertilizers during the side-dressing may be difficult because the time window for applying the fertilizer during that phase is usually short. Therefore, the process may be further improved to provide recommendations for fertilizing the field that are optimized not only in terms of the highest profits, but also for causing a minimal damage to the growing crops.

What is claimed is:

1. A method comprising:
    using instructions programmed in a computer system comprising one or more processors and computer memory, receiving, at an electronic device, over a computer network following real time gathered data:
    planting data, fertilizer data, labor data and profit data for an agricultural field;
    based on, at least in part, the planting data, the fertilizer data, the labor data, and the profit data, computing, by the electronic device, one or more penalty constraints that specify one or more conditions for determining one or more valid calendar dates, wherein a valid date is a valid calendar date that falls within a pre-planting season and/or within a side-dressing season, and one or more valid fertilizer amounts that are positive numbers selected from a date set determined for fertilizer applications;
    based on, at least in part, the planting data, the fertilizer data, the labor data, the profit data, and the one or more penalty constraints, computing, by the electronic device, an optimized fertilizing schedule that comprises the one or more valid calendar dates on which fertilizing the agricultural field is recommended and the one or more valid fertilizer amounts to be applied to the agricultural field on the one or more valid calendar dates to maximize a yield from the agricultural field;
    causing displaying the optimized fertilizing schedule on a display device;
    wherein instantaneously to the receiving of the real time data gathered in real time, the real time gathered data is used to compute the one or more penalty constraints, to compute the optimized fertilizing schedule in real time, and to display the optimized fertilizing schedule computed in real time.

2. The method of claim 1, wherein the planting data comprises: pre-planting data representing a lower bound date value and an upper bound date value of dates for a pre-planting application of fertilizer to the agricultural field;

and side-dressing data representing a lower bound date value and an upper bound date value of dates for a side-dressing application of fertilizer to the agricultural field;

wherein the fertilizer data comprises: fertilizer cost data representing a cost of a fertilizer application;

wherein the labor data comprises: labor cost data representing a cost of applying fertilizer to the agricultural field;

wherein the profit data comprises expected profit data;

wherein the method further comprises: using the instructions programmed in the computer system: determining, based on, at least in part, the pre-planting data, the side-dressing data, the fertilizer cost data, the labor cost data, the expected profit data, and the one or more penalty constraints, a type of fertilizer to be applied to the agricultural field on the one or more valid calendar dates to maximize a yield from the agricultural field.

3. The method of claim 2, wherein the one or more penalty constraints include a quadratic penalty function and one or more penalty values; wherein the one or more penalty values are determined based on one or more of: the lower bound date value and the upper bound date value of dates for the pre-planting application of fertilizer to the agricultural field, the lower bound date value and the upper bound date value of dates for the side-dressing application of fertilizer to the agricultural field, or a set of non-negative valid amounts of fertilizer.

4. The method of claim 2, wherein the one or more penalty constraints are used to determine whether to include, in determining the fertilizing schedule, one or more of: a cost of applying fertilizer to the agricultural field on a particular date, or a cost of a particular amount of fertilizer applied to the agricultural field on the particular date.

5. The method of claim 2, wherein the one or more penalty constraints are used to determine whether to include, in determining the fertilizing schedule, one or more of: a cost of labor associated with applying fertilizer to the agricultural field on a particular date, a cost of labor associated with harvesting crop from the agricultural field, or an amortization cost of equipment used to apply fertilizer to the agricultural field on the particular date, or an amortization cost of equipment used to harvest crop from the agricultural field.

6. The method of claim 2, wherein the one or more penalty constraints are used to determine whether to include, in determining the fertilizing schedule, one or more of: a cost of labor associated with applying fertilizer to the agricultural field on a particular date, a cost of labor associated with harvesting crop from the agricultural field, or an amortization cost of equipment used to apply fertilizer to the agricultural field on the particular date, or an amortization cost of equipment used to harvest crop from the agricultural field.

7. The method of claim 2, further comprising: using the instructions programmed in the computer system: generating, based on, at least in part, the pre-planting data, the side-dressing data, the fertilizer cost data, the labor cost data, the expected profit data, and the one or more penalty constraints, generating, by the electronic device, one or more additional fertilizing schedules for the agricultural field.

8. A data processing system comprising:
one or more processors;
one or more non-transitory data storage media coupled to the one or more processors and storing sequences of instructions which, when executed using the one or more processors, cause performing:
receiving, at an electronic device, over a computer network following real time gathered data:
planting data, fertilizer data, labor data and profit data for an agricultural field;

based on, at least in part, the planting data, the fertilizer data, the labor cs data, and the profit data, computing, by the electronic device, one or more penalty constraints that specify one or more conditions for determining one or more valid calendar dates, wherein a valid date is a valid calendar date that falls within a pre-planting season and/or within a side-dressing season, and one or more valid fertilizer amounts that are positive numbers selected from a date set determined for fertilizer applications;

based on, at least in part, the planting data, the fertilizer data, the labor data, the profit data, and the one or more penalty constraints, computing, by the electronic device, an optimized fertilizing schedule that comprises the one or more valid calendar dates on which fertilizing the agricultural field is recommended and the one or more valid fertilizer amounts to be applied to the agricultural field on the one or more valid calendar dates to maximize a yield from the agricultural field;

causing displaying the fertilizing schedule on a display device;

wherein instantaneously to the receiving of the real time data gathered in real time, the real time gathered data is used to compute the one or more penalty constraints, to compute the optimized fertilizing schedule in real time, and to display the optimized fertilizing schedule computed in real time.

9. The data processing system of claim 8, wherein the planting data comprises: pre-planting data representing a lower bound date value and an upper bound date value of dates for a pre-planting application of fertilizer to the agricultural field; and side-dressing data representing a lower bound date value and an upper bound date value of dates for a side-dressing application of fertilizer to the agricultural field;

wherein the fertilizer data comprises: fertilizer cost data representing a cost of a fertilizer application;

wherein the labor data comprises: labor cost data representing a cost of applying fertilizer to the agricultural field;

wherein the profit data comprises expected profit data;

wherein the processing system stores additional instructions which, when executed using the one or more processors, cause: determining, based on, at least in part, the pre-planting data, the side-dressing data, the fertilizer cost data, the labor cost data, the expected profit data, and the one or more penalty constraints, a type of fertilizer to be applied to the agricultural field on the one or more valid calendar dates to maximize a yield from the agricultural field.

10. The data processing system of claim 9, wherein the one or more penalty constraints include a quadratic penalty function and one or more penalty values; wherein the one or more penalty values are determined based on one or more of: the lower bound date value and the upper bound date value of dates for the pre-planting application of fertilizer to the agricultural field, the lower bound date value and the upper bound date value of dates for the side-dressing application of fertilizer to the agricultural field, or a set of non-negative valid amounts of fertilizer.

11. The data processing system of claim 9, wherein the one or more penalty constraints are used to determine whether to include, in determining the fertilizing schedule, one or more of: a cost of applying fertilizer to the agricultural field on a particular date, or a cost of a particular amount of fertilizer applied to the agricultural field on the particular date.

12. The data processing system of claim 9, wherein the one or more penalty constraints are used to determine whether to include, in determining the fertilizing schedule, one or more of: a cost of labor associated with applying fertilizer to the agricultural field on a particular date, a cost of labor associated with harvesting crop from the agricultural field, or an amortization cost of equipment used to apply fertilizer to the agricultural field on the particular date, or an amortization cost of equipment used to harvest crop from the agricultural field.

13. The data processing system of claim 9, wherein the one or more penalty constraints are used to determine whether to include, in determining the fertilizing schedule, one or more of: a cost of labor associated with applying fertilizer to the agricultural field on a particular date, a cost of labor associated with harvesting crop from the agricultural field, or an amortization cost of equipment used to apply fertilizer to the agricultural field on the particular date, or an amortization cost of equipment used to harvest crop from the agricultural field.

14. The data processing system of claim 9, storing additional instructions which, when executed using the one or more processors, cause: generating, based on, at least in part, the pre-planting data, the side-dressing data, the fertilizer cost data, the labor cost data, the expected profit data, and the one or more penalty constraints, generating, by the electronic device, one or more additional fertilizing schedules for the agricultural field.

15. One or more non-transitory data storage media coupled to one or more processors and storing sequences of instructions which, when executed using the one or more processors, cause performing:
    receiving, at an electronic device, over a computer network following real time gathered data:
    planting data, fertilizer data, labor data and profit data for an agricultural field;
    based on, at least in part, the planting data, the fertilizer data, the labor cs data, and the profit data, computing, by the electronic device, one or more penalty constraints that specify one or more conditions for determining one or more valid calendar dates, wherein a valid date is a valid calendar date that falls within a pre-planting season and/or within a side-dressing season, and one or more valid fertilizer amounts that are positive numbers selected from a date set determined for fertilizer applications;
    based on, at least in part, the planting data, the fertilizer data, the labor data, the profit data, and the one or more penalty constraints, computing, by the electronic device, an optimized fertilizing schedule that comprises the one or more valid calendar dates on which fertilizing the agricultural field is recommended and the one or more valid fertilizer amounts to be applied to the agricultural field on the one or more valid calendar dates to maximize a yield from the agricultural field;
    causing displaying the fertilizing schedule on a display device;
    wherein instantaneously to the receiving of the real time data gathered in real time, the real time gathered data is used to compute the one or more penalty constraints, to compute the optimized fertilizing schedule in real time, and to display the optimized fertilizing schedule computed in real time.

16. The one or more non-transitory data storage media of claim 15, wherein the planting data comprises: pre-planting data representing a lower bound date value and an upper bound date value of dates for a pre-planting application of fertilizer to the agricultural field; and side-dressing data representing a lower bound date value and an upper bound date value of dates for a side-dressing application of fertilizer to the agricultural field;
    wherein the fertilizer data comprises: fertilizer cost data representing a cost of a fertilizer application;
    wherein the labor data comprises: labor cost data representing a cost of applying fertilizer to the agricultural field;
    wherein the profit data comprises expected profit data;
    wherein the one or more non-transitory storage media stores additional instructions which, when executed using the one or more processors, cause: determining, based on, at least in part, the pre-planting data, the side-dressing data, the fertilizer cost data, the labor cost data, the expected profit data, and the one or more penalty constraints, a type of fertilizer to be applied to the agricultural field on the one or more valid calendar dates to maximize a yield from the agricultural field.

17. The one or more non-transitory data storage media of claim 16, wherein the one or more penalty constraints include a quadratic penalty function and one or more penalty values; wherein the one or more penalty values are determined based on one or more of: the lower bound date value and the upper bound date value of dates for the pre-planting application of fertilizer to the agricultural field, the lower bound date value and the upper bound date value of dates for the side-dressing application of fertilizer to the agricultural field, or a set of non-negative valid amounts of fertilizer.

18. The one or more non-transitory data storage media of claim 16, wherein the one or more penalty constraints are used to determine whether to include, in determining the fertilizing schedule, one or more of: a cost of applying fertilizer to the agricultural field on a particular date, or a cost of a particular amount of fertilizer applied to the agricultural field on the particular date.

19. The one or more non-transitory data storage media of claim 16, wherein the one or more penalty constraints are used to determine whether to include, in determining the fertilizing schedule, one or more of: a cost of labor associated with applying fertilizer to the agricultural field on a particular date, a cost of labor associated with harvesting crop from the agricultural field, or an amortization cost of equipment used to apply fertilizer to the agricultural field on the particular date, or an amortization cost of equipment used to harvest crop from the agricultural field.

20. The one or more non-transitory data storage media of claim 16, storing additional instructions which, when executed using the one or more processors, cause: generating, based on, at least in part, the pre-planting data, the side-dressing data, the fertilizer cost data, the labor cost data, the expected profit data, and the one or more penalty constraints, generating, by the electronic device, one or more additional fertilizing schedules for the agricultural field.

* * * * *